Figure 1:
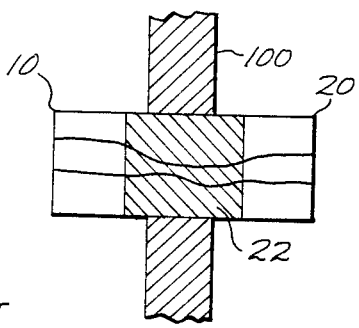

United States Patent [19]

Braun

[11] 4,423,924
[45] Jan. 3, 1984

[54] STAR COUPLER BULKHEAD CONNECTOR

[75] Inventor: Ralph F. Braun, Seattle, Wash.

[73] Assignee: The Boeing Company, Seattle, Wash.

[21] Appl. No.: 307,344

[22] Filed: Sep. 30, 1981

[51] Int. Cl.³ .............................................. G02B 7/26
[52] U.S. Cl. .................... 350/96.16; 350/96.20
[58] Field of Search ............... 350/96.15, 96.16, 96.20, 350/96.21, 96.22

[56] References Cited

U.S. PATENT DOCUMENTS

| | | | |
|---|---|---|---|
| 3,825,320 | 7/1974 | Redfern | 350/96.22 |
| 3,883,681 | 5/1975 | Campbell | 350/96.20 X |
| 3,951,515 | 4/1976 | Allard | 350/96.22 |
| 4,172,212 | 10/1979 | Heinzer | 350/96.21 X |
| 4,198,118 | 4/1980 | Porter | 350/96.16 |
| 4,214,809 | 7/1980 | Reh | 350/96.20 |
| 4,227,260 | 10/1980 | Vojvodich et al. | 350/96.16 X |
| 4,305,641 | 12/1981 | Witte | 350/96.15 |

FOREIGN PATENT DOCUMENTS 56-113113 9/1981 Japan ................... 350/96.20

Primary Examiner—John D. Lee
Attorney, Agent, or Firm—Conrad O. Gardner; Bernard A. Donahue; Nicolaas DeVogel

[57] ABSTRACT

A star coupler bulkhead connector for equalizing signal levels over different transmission paths where one of the transmission paths includes pressure bulkhead penetration. The signal path which includes pressure bulkhead penetration comprises a data bus including a plurality of optical fibers directly coupled from the mixer element of the star coupler through the bulkhead.

2 Claims, 2 Drawing Figures

U.S. Patent        Jan. 3, 1984        4,423,924

STAR COUPLER BULKHEAD CONNECTOR

This invention relates to bulkhead connectors and more particularly to a bulkhead connector comprising a star coupler.

The patent literature has shown in U.S. Pat. No. 3,951,515 the utilization of multi-channel fiber-optic connector configurations for use in bulkhead environments. Also, the patent literature includes U.S. Pat. No. 4,227,260 which shows the utilization of an active star element associated with input and output connectors. Also, the patent literature should be noted for its showing of fiber-optic bulkhead penetrators as shown in U.S. Pat. Nos. 3,825,320; 3,883,681; and, 4,214,809. A potential requirement for airborne applications is the need to penetrate pressure bulkheads. Current connector designs are not suitable nor do they provide a good technical solution to the problem. A normal and direct solution to the problem is the utilization of two connectors, one on either side of the bulkhead, with an intervening material to effect the seal. It should be noted that data buses also require a coupler; therefore, it might be envisioned that for airborne applications, in the case of pressure bulkhead penetration a box containing the coupling device plus the necessary fiber-optic connectors to interface to the network would be utilized.

It is accordingly an object of the present invention to provide means for penetrating a pressure bulkhead without the use of added passive coupling devices between the mixer element of an optical data signal processing device and utilization means outside the pressure bulkhead.

It is still another object of the present invention to provide a pressure bulkhead connector wherein a data bus of optical fibers is coupled between the mixer element of a star coupler on one side of the bulkhead and utilization means on the other side of the bulkhead.

It is yet another object of the present invention to provide means for equalizing signal levels over different transmission paths wherein at least one of the transmission paths includes transmission though a pressure bulkhead.

A preferred embodiment of the present invention includes a star coupler bulkhead connector wherein the optical fibers coupled to the mixer element extend thrugh the bulkhead to utilization means on the side of the bulkhead remote from the mixer element of the star coupler.

Figure 2:
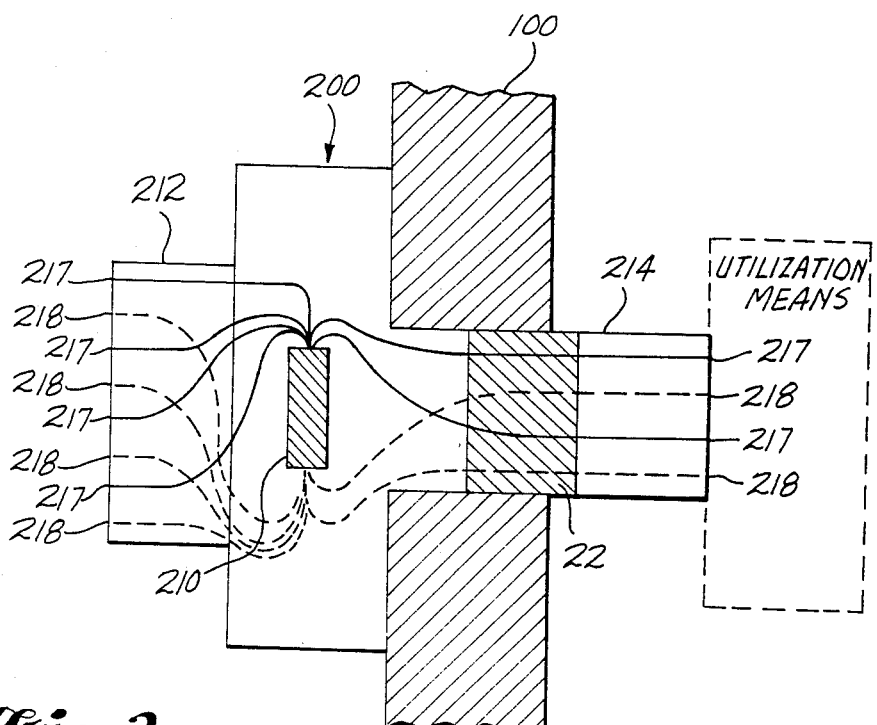

A full understanding of the present invention, and of its further objects and advantages and the several unique aspects thereof, will be had from the following description when taken in conjunction with the accompanying drawings in which:

FIG. 1 is a sectional view of a prior art approach to providing penetration of a pressure bulkhead by fiber-optic data buses; and, FIG. 2 is a sectional view of a preferred embodiment of the present invention showing coupling of data bus optical fibers between the mixer element of a star ou- pler and utilization means on the remote side of the pressure bulkhead.

It should be noted that as fiber-optic technology matures, the limitations on individual components decrease. This means that for fiber-optic data buses, the quality of components is no longer the dominant factor while the quantity of components begins to play a much more important role. Thus, large efficiency changes in components (especially fiber, connector, and couplers) are no longer expected to be realized. Therefore, improvements in the performance of fiber-optic data buses and transmission systems can most be realized by reducing the number of components required. The present invention relates to the problem of penetrating pressure bulkheads where it might be normally considered to utilize one connector on each side of the bulkhead for coupling to and from the data buses over the different transmission paths. This approach is shown in FIG. 1, labeled prior art, where fiber connectors 10 and 20 are utilized on either side of the pressure bulkhead 100, and where sealant material 22 is utilized between the connectors to maintain the seal.

Turning now to FIG. 2, a preferred embodiment of the present invention shows the realization of an actual reduction of two connectors from data bus transmission systems of the type shown in FIG. 1 which require first and second connectors on either side of the bulkhead. This becomes a very important factor where losses would be increased in the system of FIG. 1 since signal levels over different paths including the path going through the pressure bulkhead would be different. In the system of FIG. 2 and in accordance with a preferred embodiment of the present invention, the signal levels over all the transmission paths including the path going through a pressure bulkhead are equalized due to the elimination of the additional connectors which were required in the prior art approach of FIG. 1.

Turning now in more detail to the star coupler pressure bulkhead connector of FIG. 2, it should be noted that a star coupler 200 includes the usual fiber-optic connectors 212 and 214 for coupling to the mixer element 210 of star coupler 200. Fiber-optic connectors 212 and 214 include transmission paths comprising the usual input optical fibers 217 and output optical fibers 218 which are coupled to and from mixer element 210. The input and output fiber-optic elements 217 and 218 making up the data bus of fiber-optic connector 214 are seen in FIG. 2 to be directly coupled from mixer element 210 through pressure bulkhead 100 and where sealant material 22 is utilized to maintain the seal, to utilization means (not shown in the figure) coupled to the end of fiber-optic connector 214. This arrangement utilizing a star coupler 200 can be compared to the pressure bulkhead coupling of a data bus as shown in the prior art of FIG. 1 where a pair of connectors were interposed to provide a transmission path through the pressure bulkhead 100. The consequent equalization of signal levels over different transmission paths can be observed from FIG. 2 since no additional connectors are interposed in a transmission path going through the pressure bulkhead 100. The present combined star coupler/pressure bulkhead connector of FIG. 2 when utilized in the fuselage/wheel well interface in an aircraft will allow a fiber-optic data bus functioning in the fuselage to be interconnected with the various sensors and actuators in the wheel well area. By eliminating the need for a separate pressure bulkhead connector, the attendant advantages hereinbefore mentioned also include a reduction of the necessary hardware and consequent improvement in capacity efficiency and/or safety of the system. A consequent reduction in hardware will improve the dynamic range of the system (reduce it). As hereinbefore mentioned, the performance of the fiber-optic data bus is dependent on the number of components in the system. Any length of the data bus which must pass to a separate pressure bulkhead connector arrangement, such as shown in FIG. 1, will possess a lower strength data signal as it will incorporate at least two additional conductors (and associated losses) over lengths which did not penetrate a pressure bulkhead.

What is claimed is:

1. A pressure bulkhead connector for coupling a plurality of optical data bus signals over a transmission path through a pressure bulkhead to utilization means, said pressure bulkhead connector comprising:
   a star coupler including a mixer element disposed on one side of said pressure bulkhead; and,
   a plurality of optical fibers coupled between said mixer element and utilization means disposed on a further side of said pressure bulkhead.

2. A pressure bulkhead penetrator for transmitting optical data information through a pressure bulkhead, said pressure bulkhead penetrator comprising:
   a star coupler having input and output optical fibers coupled to a mixer element; and,
   a plurality of said input and output optical fibers disposed through an aperture in said pressure bulkhead between said mixer element and utilization means disposed on a side of said pressure bulkhead remote from said mixer element for transmitting said optical data information through said pressure bulkhead.

* * * * *